United States Patent [19]

Cretin et al.

[11] 4,398,271
[45] Aug. 9, 1983

[54] DEVICE FOR DATA TRANSMISSION BETWEEN SEISMIC DATA ACQUISITION DEVICES AND A RECORDING DEVICE

[75] Inventors: Jacques Cretin, Le Chesnay; Claude Beauducel, Henouville, both of France

[73] Assignees: Institut Francais du Petrole, Paris; Compagnie Generale de Geophysique, Massy, both of France

[21] Appl. No.: 213,760

[22] Filed: Dec. 5, 1980

[30] Foreign Application Priority Data

Dec. 7, 1979 [FR] France ................. 79 30287

[51] Int. Cl.³ ............ G01V 1/22; H04B 3/46
[52] U.S. Cl. ...................... 367/20; 367/13;
367/79; 370/16
[58] Field of Search .............. 367/78, 79, 80, 20,
367/21, 13; 370/16, 85

[56] References Cited

U.S. PATENT DOCUMENTS

| | | | |
|---|---|---|---|
| 2,680,162 | 6/1954 | Brehm et al. | 370/16 |
| 3,760,107 | 9/1973 | Duerdoth et al. | 370/16 |
| 4,002,847 | 1/1977 | Dail | 370/16 |
| 4,092,629 | 5/1978 | Siems et al. | 367/15 X |
| 4,190,821 | 2/1980 | Woodward | 370/16 |
| 4,254,496 | 3/1981 | Munter | 370/16 |

*Primary Examiner*—Richard A. Farley
*Attorney, Agent, or Firm*—Millen & White

[57] ABSTRACT

A device for transmitting seismic data informations from acquisition devices of a seismic streamer to a central recorder an a ship, comprises at least two outward, and at least tow inward transmission lines made up of line sections interconnected by interconnection systems including means for the reconfiguration of signals, means for detecting order signals receives at said interconnection systems and switching means, and controlled by the detection means to connect different line sections, previously tested, and to by-pass faulty sections so as to form one outward and one inward continuous transmission line in good operating condition.

21 Claims, 7 Drawing Figures

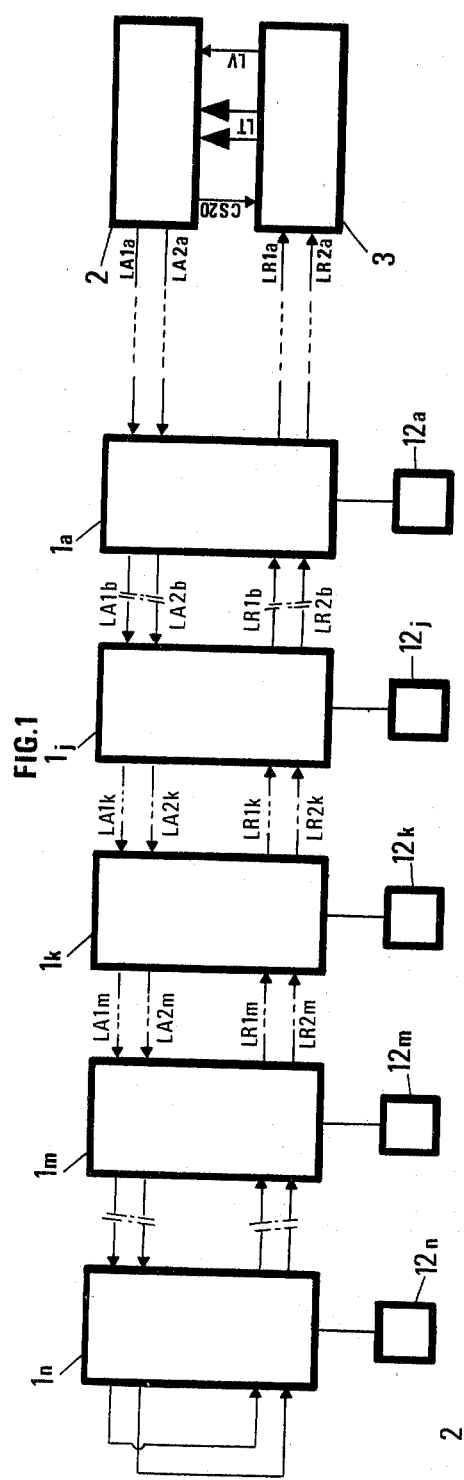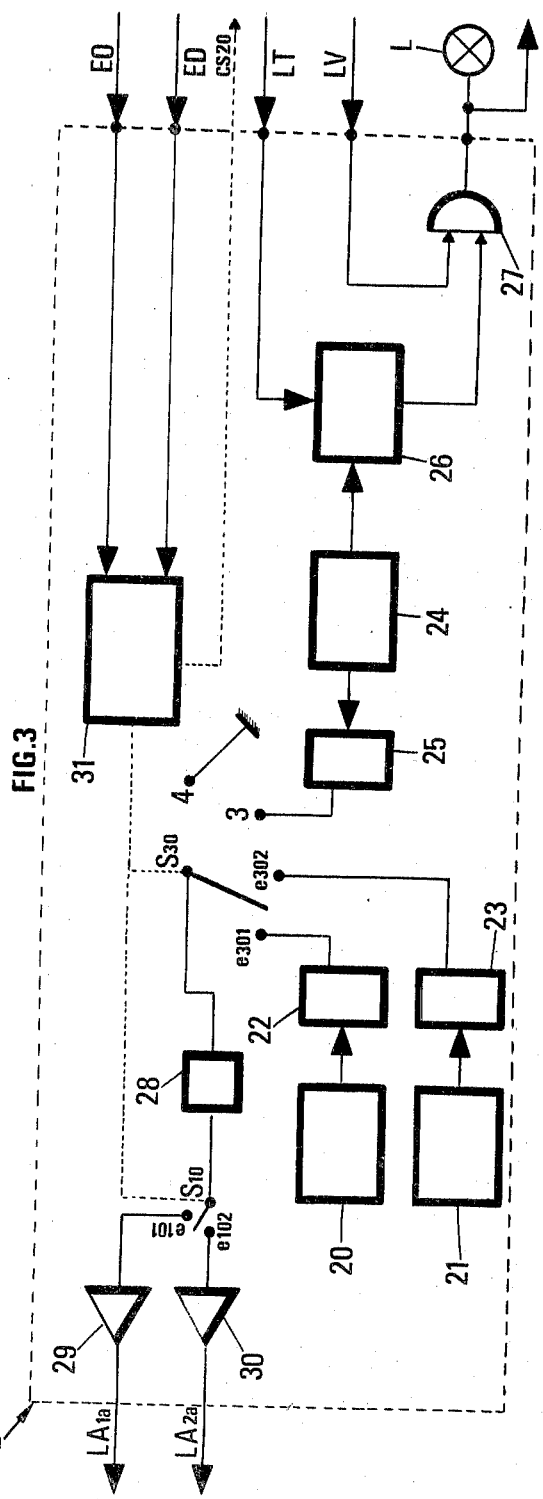

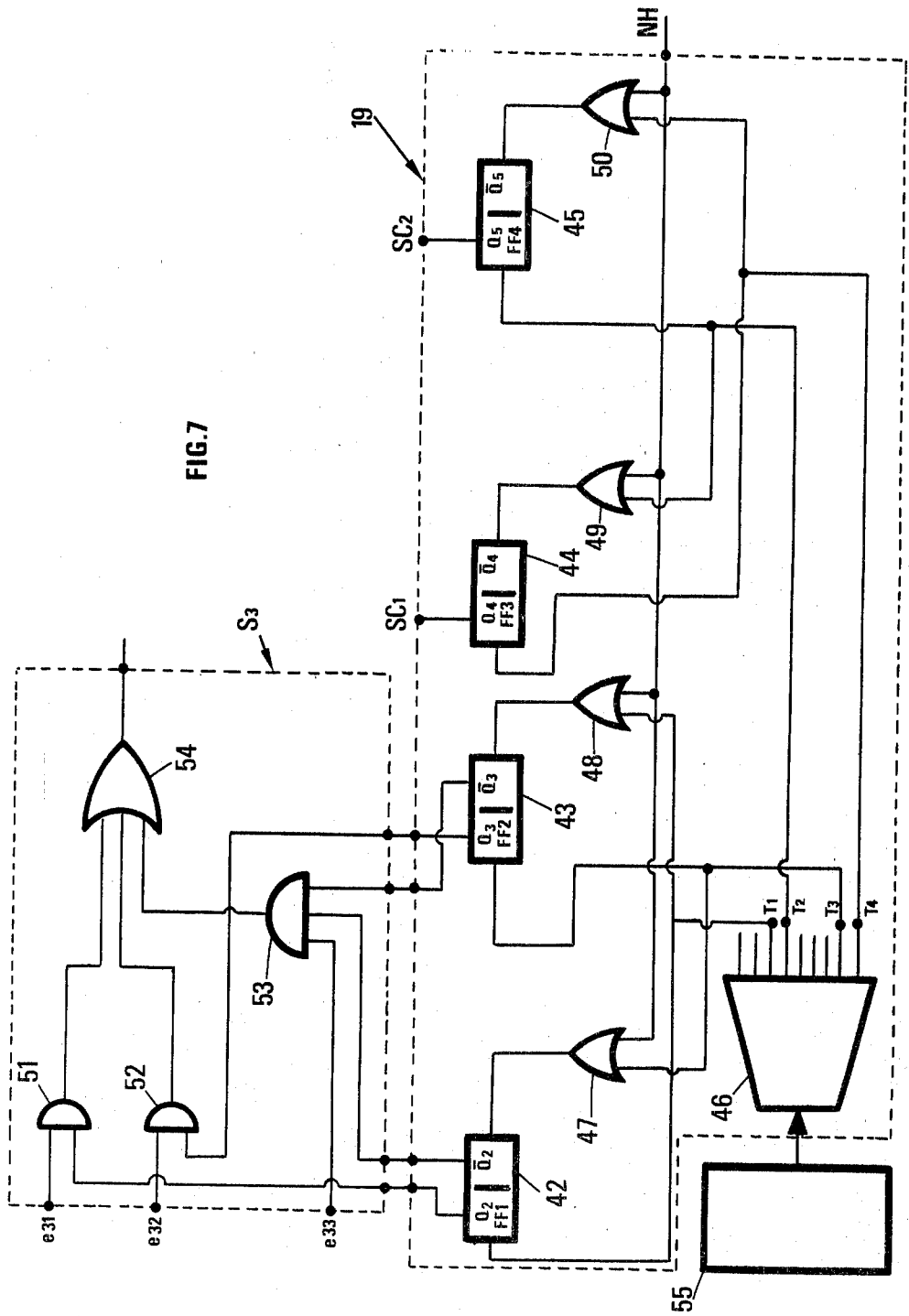

DEVICE FOR DATA TRANSMISSION BETWEEN SEISMIC DATA ACQUISITION DEVICES AND A RECORDING DEVICE

BACKGROUND OF THE INVENTION

This invention relates to a device for transmission of information between a plurality of data acquisition devices and a central recording device.

More particularly, the transmission system according to the invention is adapted to transmit to a central recording device, located on a ship, seismic informations, collected from hydrophones of a seismic streamer of great length and previously gathered in a certain number of data acquisition devices distributed over the streamer.

The marine seismic prospecting methods generally comprise the transmission of acoustic waves through water, the reception of echoes of these seismic waves, after reflection on various reflectors or mirrors of the submerged formations, and their recording. The reception of echoes is performed by means of a generally high number of interconnected hydrophones or hydrophone groups, arranged at regulator intervals along an elongate seismic streamer towed behind the ship. Each interconnected hydrophone or hydrophone group is connected, through a pair of conductors, to a single data recording system located on the ship. The recorded signals emanating from each hydrophone group, form a trace. The seismic streamers generally consist of elements connected to one another through detachable connection systems comprising connectors for electrically interconnecting the different conductor pairs, the assembly being connected to the ship.

The most recent seismic methods comprise the use of more and more numerous hydrophones distributed along seismic streamers of an increasing length which may reach three or four kilometers in length. The number of hydrophone groups forming the seismic streamer may reach 500. The use of a reception device of such a great length enables to increasing the resolution power, i.e. the ability to differentiate two adjacent geologic layers of the system. Moreover, when a substantial number of recording traces is available, it is possible, in a later processing stage, to effect a number of various different combinations by varying the number of traces used in these combinations and, consequently, the configuration of the assembly of the hydrophone groups producing the combined signals. Thereby are avoided the changes which must be made in the geometry of less complex seismic streamers in order to proceed to certain combinations, in view of the more limited number of recording traces which can be combined.

The number of conductors to interconnect through connectors in seismic streamers of great length comprising a large number of hydrophones, may be very substantial. In the example of a seismic streamer designed to give 500 traces, it is necessary to make use of connectors with 1000 pins. It is easily understood that the reliability of such seismic data transmission systems quickly becomes questionable when the number of traces to be recorded increases.

A known process for simplifying the information transmission facilities consists of making use of information analog multiplexing. The hydrophones or hydrophone groups are sequentially connected through switches to a single pair of connectors. The transmitted information consists of a sequence of analog samples successively delivered by hydrophone groups. However, this process does not give satisfactory results since diaphony between the signal samples is much too high.

Another known process for avoiding the disadvantages due to the analog multiplexing consists of making use of multiplexing of digital type. Inside the reception device are arranged interconnected data acquisition assemblies spaced from one another. Each acquisition assembly is adapted to convert the analog signals produced by an assembly of hydrophones or hydrophone groups distributed over a section of a seismic streamer to digital signals and to store them in a memorizing member.

A first mode for connecting the data acquisition assemblies to the central recording system consists of a parallel connection on two connecting omnibus cables. The recording system successively transmits interrogation signals, through one of the omnibus cables, to the different data acquisition assemblies, and orders them to sequentially connect themselves onto the other omnibus cable and to transmit thereto the digitized data recorded therein after the preliminary emission of recognition signals to acknowledge reception of the transmitted orders. The transmission of the recorded data is preceded or followed with that of service signals which, by increasing the rate of information to be transmitted, makes necessary a widening of the bandwidth. However, this bandwith tends to become more and more damaged as the length of the omnibus cables on which are connected the data acquisition systems increases up to a length which may sometimes reach several kilometers.

In addition, as the data acquisition systems are not disconnectable, the malfunctioning of one of them may deform the information transmitted from the others.

According to another arrangement, the transmission device comprises a plurality of information amplification and/or regeneration members (usually called "repeaters" or repeater-regenerators) which are serially interconnected to a single transmission line.

Some of them comprise switching means adapted to connect the following length section with either the preceeding line section or with a data acquisition assembly. Control means, located on the ship, enables, by conveniently actuating the different switching means, to successively connect the different data acquisition assemblies. The transmission of the information is performed serially in a synchronous manner. It must be observed that with such a transmission device, the malfunctioning of one amplification and/or regeneration member may be sufficient to stop any information transmission. This disadvantage is particularly troublesome in marine seismic prospecting since repairs require the rewinding of the seismic streamer.

According to another arrangement, the various data acquisition devices are connected to the central recording device through at least three different transmission lines and the informations are transmitted on these three lines. The central recording device makes comparisons between the simultaneously received informations to select therefrom those which have been correctly transmitted and to detect eventual transmission errors. The tests are thus conducted simultaneously with the transmission of the seismic informations.

SUMMARY OF THE INVENTION

The information transmission device according to the invention enables connection of a plurality of data acquisition devices to a central receiving and recording device while avoiding the disadvantages of the prior devices.

The device comprises a plurality of interconnection systems respectively associated with data acquisition devices and serially connected, on the one hand to an assembly for selecting the transmission lines, through at least two different transmission lines formed of a plurality of line sections and called hereinafter, outward transmission lines, and on the other hand, to the central receiving and recording device through at least two different transmission lines made up of a plurality of line sections, hereinafter called inward transmission lines, and each interconnection system comprises means for detecting signals received on the outward line sections reaching said interconnection system and switching means, controlled by said detection means, for directing the received signals or those emanating from the seismic data acquisition device associated thereto, onto one of the outward or inward transmission line sections running from said interconnection system.

By means of appropriate control of the different interconnection systems, it is possible to proceed to transmission tests for detecting discontinuities occurring in the transmission lines and to effect numerous different combinations of the successive line sections to find at least one continuous data transmission channel towards the recording device, thereby avoiding lengthy failures.

At the end of the tests, after determination of a combination of line sections forming a continuous transmission channel, this single channel is preferably used for transmitting all the informations relating to a seismic "shot". Accordingly it is unnecessary to give any attention to eventual transfer time lags which are observed in the transmission systems where several transmission lines are used in parallel to transfer the informations and where the eventual transmission errors are detected during the acquisition phases by comparison with the received informations.

BRIEF DESCRIPTION OF THE DRAWINGS

Other characteristics and advantages of the device according to the invention will be made apparent from the following description of a non limitative embodiment thereof, given by way of example and with reference to the accompanying drawings wherein:

FIG. 1 diagrammatically shows the assembly of the interconnection systems equipping the outward and inward transmission lines;

FIG. 3 diagrammatically shows the assembly for selecting the transmission lines;

DETAILED DISCUSSION OF THE DRAWINGS

The transmission device shown in FIG. 1 comprises a chain of interconnection systems $1a \ldots 1j$, $1k$, $1m \ldots 1n$ distributed at regular intervals inside a seismic streamer of great length. Each of them is associated with an acquisition device $12a \ldots 12j$, $12k$, $12m \ldots 12n$ used for collecting and recording the seismic informations emanating from an assembly of seismic sensors or sensor groups (not shown) of a streamer section. It also comprises two outward transmission lines LA1, LA2 each consisting of a plurality of line sections, respectively LA1a, LA1b ... LA1k ... LA1n and LA2a, LA2b ... LA2k ... LA2n, serially connecting the interconnection systems to a selection assembly 2 of the transmission lines and two inward transmission lines LR1, LR2 consisting of a plurality of line sections, respectively LR1a, LR1b ... LR1k LR1n and LR2a, LR2b, ... LR2k ... LR2n, serially connecting the interconnection systems to a central receiving and recording device 3. The outward and inward transmission lines are respectively interconnected beyond the last interconnection system of the seismic streamer. The transmission of the test signals and of the seismic data is effected through the transmission lines in accordance with the digital transmission code of the French PTT Office, called code HDB 3. This code has the particularity of enabling the simultaneous transmission of data and clock signals. The information to be transmitted, either relating to test operations or concerning seismic data, is incorporated to digital words having a standard structure called network and consisting, for example, of several parts or cells having distinct functions:

| PREFIX | ORDER | SERIAL NUMBER OF THE ACQUISITION SYSTEM | PLACE FOR INFORMATION | SUFFIX |
|--------|-------|------------------------------------------|-----------------------|--------|
| 1 | ← | 2 → | 3 | 4 |

The prefix consists of a particular combination of bits which never occurs in the useul information and whereby it is accordingly possible to detect unequivocally the beginning of a network. The second cell comprises a first group of three bits designating a serial number which indicates that the following operation is a data acquisition phase or a test phase and a second group designating the serial number of the acquisition system concerned with that order. A third cell is devoted to test data or to seismic data. In this later case, the third cell remains empty and available when the serial number of the interconnection system traversed by the digital word is different from that registered in its second cell. A fourth optional cell contains an eventual suffix which terminates the transmitted word. The sequential operation of the assembly of the elements forming the transmission device is time shared by a single clock contained in the line selection assembly 2 and whose reference frequency sets the rate of transmission of the successive bits of each digital word.

Figure 2:
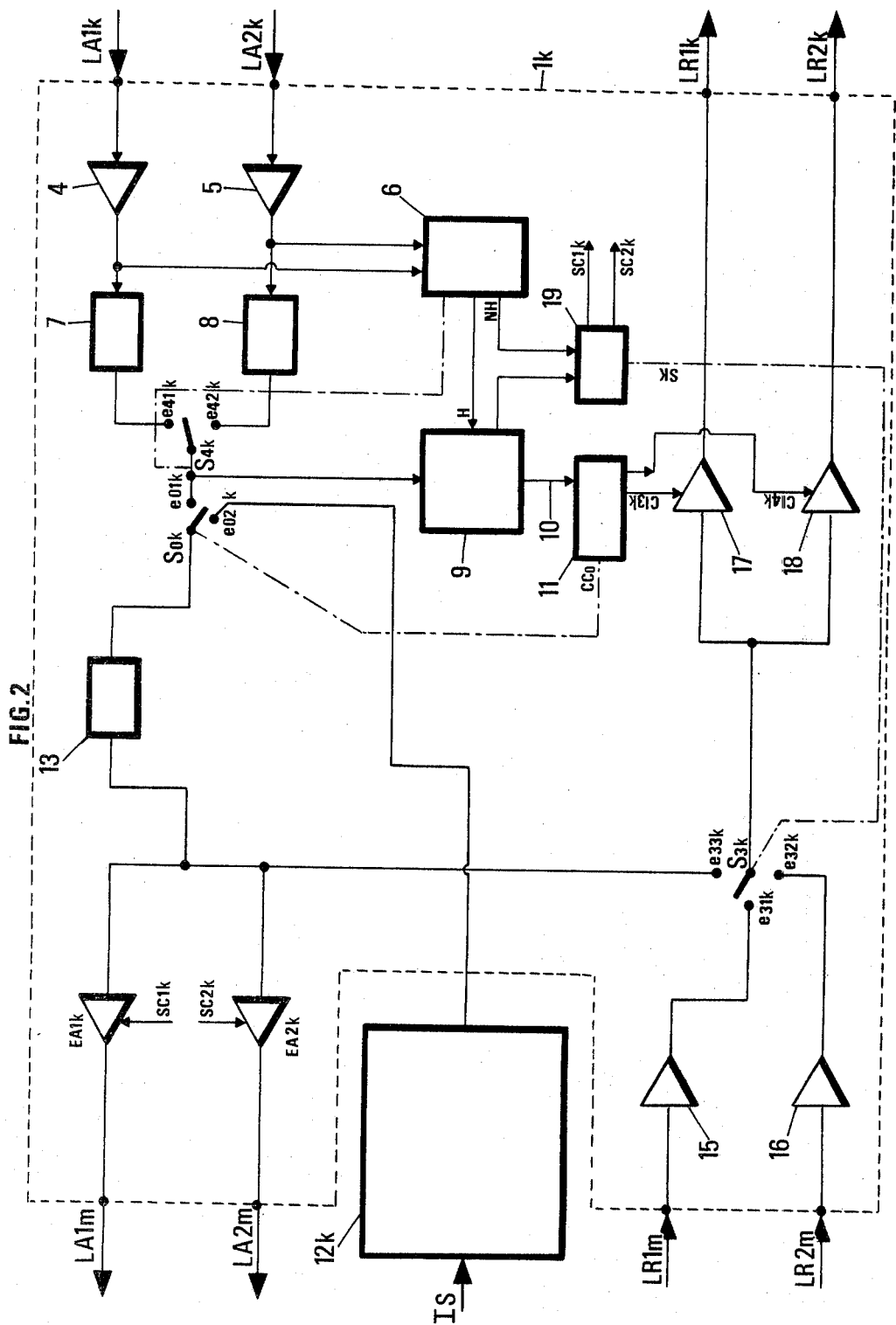
FIG. 2 diagrammatically shows an interconnection system associated with a data acquisition device.

The interconnection system 1$k$ shown in FIG. 2 first comprises means adapted to reconstitute a clock signal of the same frequency as that of the main clock included in the line selection member 2 (FIG. 1) and to reshape the digital words which have been damaged during the transmission, these means consisting, for example, of two repeater-regenerator amplifiers 4 and 5 of a known type, whose inputs are respectively connected to the ends of two sections of the outward transmission lines LA1$k$ and LA2$k$ and whose outputs are connected, on the one hand to the respective inputs of two decoders 7 and 8 of a known type, adapted to decode the digital words expressed in the selected code (HDB 3) and transmitted through the data interconnection system 1$j$ placed before system 1$k$ on the transmission line sections LA1$k$, and LA2$k$ (FIG. 1) and the outputs of the two decoders 7 and 8 are respectively connected to the inputs e41$k$ and e42$k$ of a first electronic switch S4$k$. The outputs of the two amplifiers 4 and 5 are also connected to a detection member 6 adapted to detect the presence of a clock signal in the regenerated digital words emanating from line sections LA1$k$ and LA2$k$. According to the ditection of a clock signal either on the section LA1$k$ or on the section LA2$k$, the detection member switches the switch S4$k$ on input e41$k$ or e42$k$.

Figure 4:
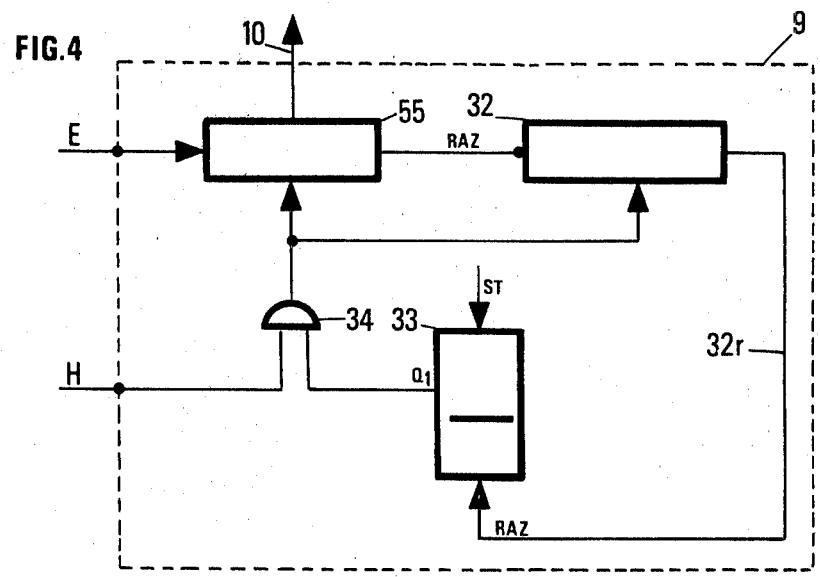
FIG. 4 diagrammatically shows a network recognition circuit.

The output of switch S4$k$ is connected on the one hand to a first input e01$k$ of a second electronic switch S0$k$ controlled by a signal CCo and, on the other hand, to a recognition circuit 9 adapted to detect the network of digital words circulating through one or the other of the line sections LA1$k$ or LA2$k$. An example of one embodiment of this circuit is shown in FIG. 4 and will be described later. The second input e02$k$ of the second switch S0$k$ is connected to the output of the local device 12$k$ for acquisition of seismic data IS emanating from different sensors or sensor groups of the corresponding streamer section. The output of the second switch So$k$ is connected to the input of an encoder 13 of a known type, adapted to encode the digital words in the selected code (HDB 3). By way of example, the encoding and decoding of the informations conveyed through the transmission lines will be performed by encoding and decoding members placed together in the same integrated circuit (of type TMS 38-85 of Texas Instruments).

The output of encoder 13 is connected on the one hand to the respective inputs of two line amplifiers EA1$k$ and EA2$k$ whose operation is controlled through inhibition signals respectively SC1$k$ and SC2$k$, and, on the other hand, to a third input e33$k$ of a switch S3$k$ with three inputs. The outputs of the line amplifiers EA1$k$, EA2$k$ are respectively connected to the inputs of the interconnection system 1$m$ placed after system 1$k$, through two outward transmission line sections LA1$m$ and LA2$m$ (FIG. 1). The inward line sections LR1$m$, LR2$m$, running from the interconnection system 1$m$, are respectively connected to the inputs of two amplifiers-regenerators 15 and 16. The outputs of these two amplifiers are respectively connected to the first input e31$k$ and to the second input e32$k$ of the third switch S3$k$, whose output is connected to the respective inputs of two line amplifiers 17 and 18 respectively controlled by inhibition signals C13$k$ and C14$k$. The outputs of the two amplifiers 17 and 18 are connected to the respective inputs of amplifiers-regenerators 15 and 16 of the interconnection system 1$j$ through two inward transmission line sections LR1$k$ and LR2$k$ (FIG. 1).

A combination element 19 receiving the control signals emanating from the detection member 6 and from the recognition circuit 9 is adapted to combine them and to generate the inhibition signals SC1$k$ and SC2$k$ for line amplifiers EA1$k$ and EA2$k$, as well as the signal SK for controlling the third switch S3$k$ (see the part of the description relating to FIG. 7). A connection member 10 provides for the transfer to a decoding member 11 of the group of bits constituting the second cell of each digital word. This member 11 is adapted to generate the control signal CCo of the second switch S0$k$ and the inhibition signals C13$k$ and C14$k$.

The above-described device is operated by means of a combination of outward line sections and another combination of inward line sections, such that the seismic informations recorded in all the local acquisition devices 12$a$ . . . 12$k$ . . . 12$n$ may be sequentially transmitted to the central receiving and recording device 3.

The interconnection systems 1$j$ and 1$k$, for example, are interconnected through two outward line sections LA1$k$ and LA2$k$, and through two inward line sections LR1$k$ and LR2$k$.

When these four sections are in good condition, four different possibilities exist for joining the two interconnection systems. When one of the outward line sections LA1$k$ or LA2$k$ is faulty, it is possible to combine the other outward line section with any one of the inward line sections LR1$k$ or LR2$k$, to link the two interconnection systems. Similarly, when one of the inward line sections LR1$k$ or LR2$k$ is faulty, it is possible to combine the other with any one of the outward line sections LA1$k$ or LA2$k$ to ensure a correct interconnection. When an outward line section LA1$k$ or LA2$k$ and an inward line section LR1$k$ or LR2$k$ are faulty, there is only one possibility of correct interconnection. In order that the informations may be correctly conveyed through the transmission lines, it is necessary to determine between each couple of the successive interconnection systems, the one or more combinations of outward and inward transmission line sections providing for a correct interconnection and, consequently, to proceed to a series of successive tests to determine at least one complete channel for the conveyance of informations relating to orders or seismic signals.

Each interconnection system is adapted to direct the information it receives on a line section according to the orders contained in the digital words transmitted thereto by the line selection assembly 2. When no information is conveyed through one of the outward line sections LA1k and LA2k, reaching the interconnection system 1k, the detection member 6 does not detect any clock signal. The combination member 19 then generates inhibition orders SC1k, SC2k for amplifiers EA1k and EA2k and switches the switch S3k on its input E33k. The interconnection systems (1m . . . 1n) are then isolated and the transmission line sections LA1k or LA2k running from the interconnection system 1j are connected through an internal loop with the line sections LR1k and LR2k returning thereto. This is what happens, for example, at the initial instant of starting operation of the different interconnection systems where all the switches S3 provide for the connection through an internal loop of the outward lines and the inward lines since no clock signal has been yet detected.

The detection of a clock signal on the line LA1k or LA2k is however insufficient to release the amplifiers EA1k and EA2k, since it is necessary to wait until a specific order is received by the recognition circuit 9, to cause discontinuation of the inhibition signals SC1k and SC2k.

When the information emanating from the interconnection system 1j placed before the system 1k (FIG. 1) are conveyed through line LA1k or LA2k, the detection member 6 is adapted to switch the switch S4k on its inputs e41k or its input e42k. In accordance with the origin of the information to transmit through one of the outward line sections LA1m or LA2m or one of the inward line sections LR1k or LR2k, information issuing either from the acquisition system 1j or from the local acquisition device 12k, the decoding member 11 generates a control signal CCo to switch the switch S0k on its input e01k or its input e02k. Similarly, the combination member 19 is adapted to position the switch S3k in accordance with the origin of the informations to transmit to the acquisition system 1j, which are issued from the system 1m or from the local system 1k. When the switch S3k is in position 3 (input e33k), the inhibition signals C 13k and C 14k permit to select one of the two transmission line sections LR1k or LR2k.

The test operations first consist of testing the outward and inward transmission line sections between the first interconnection system 1a (FIG. 1) and the line selection assembly 2. The constituting elements of the interconnection systems other than 1k being identical to those of the interconnection system 1k, are designed by the same reference numbers, optionally with a corresponding index assigned thereto. To determine the location of a member having an index different from k, it suffices to spot on FIG. 2 the location of the member having index k.

Before the initial instant of beginning the tests, the switch S3a is switched by the combination member 19 on its position 3 (input e33a) in the absence of detection of a clock signal on one of the line sections LA1a or LA2a, the line amplifiers EA1a and EA2a are inhibited (signals SC1a and SC2a), thereby isolating the farther interconnection systems. The switch S0a is in position 1 (input e01a) and the detection member 11a generates signals C13a, C14a authorizing amplifiers 17 and 18 of the system to emit. The line selection assembly 2 conveys a signal successively on the two sections LA1a, LA2a. The detection member 6 switches the switch S4a on the line section where it has detected a clock signal. The order contained in the second cell of the test words enables the switching of switch S0a on its input e01a. One or the other of the outward line sections LA1k or LA2k is then connected to one of the line sections LR1a or LR1b according to the selection of the line amplifier 17 or 18 which has been enabled by the decoding member 11. There is then determined the combination of outward and inward line sections for which an identity is observed between the digital words which have been transmitted and those which are received. The series of tests relating to the first interconnection system is conducted in accordance with the organigram of Table I. After a correct outward and inward transmission channel has been determined, a reference number is given to the first interconnection system.

Then the successive testing of the following interconnection systems 1b, 1c . . . 1j, 1k, 1m . . . 1n, is performed in accordance with an identical standard organigram for all these tests (Table II), but which differs from the organigram of Table I in that it makes use for each interconnection system (1k for example) of the system just previously tested (system 1j in the present case). As a matter of fact, the test of the outward and inward line sections LA1k, LA2k, LR1k and LR2k, requires that the preceding system may proceed to selections by means of inhibition signals SC1j, SC2j for line amplifiers EA1j, EA2j and of signal SK for controlling the switch S3j and, consequently, that the orders contained in the transmitted digital words also concern this preceding system.

In the absence of detection of clock signal on one of the line sections LA1k or LA2k (resulting from the inhibition of line amplifiers EA1j and EA2j of the preceding system 1j), the amplifiers of line EA1k and EA2k are inhibited at the initial instant of the test, the switch S3k is in position 3 (input e33k), which ensures the internal loop connection of the outward and inward line sections LAk and LRk, the switch S0k is in position 1 (input e01k) and the signals C13k and C14k authorize the amplifiers 17 and 18 to emit. The line selection device 2 transfers digital words (networks) on a transmission channel which is recognized as correct after the successive tests applied to systems 1a, 1b . . . 1j, and which aggregates all these systems. The second cell of each digital word comprises either an order relating to the emission or an order relating to the reception. In the first case, the order is used to inhibit one of the line amplifiers EA1j or EA2j of the preceding system 1j and to select one of the line sections LA1k or LA2k, as well as the identification number of the concerned system (1j). The order relating to the reception also comprises the identification number of the concerned system 1j and authorizes the switching of switch S3j on its input e31j or e32j for the selection of one of the inward line sections LR1k or LR2k. The test words are successively applied onto the line sections LA1k and LA2k and successively received on the inward line sections LR1k and LR2k, then transmitted to the selection device 2 through an inward transmission channel recognized as correct after the successive tests applied to systems 1a, 1b . . . 1j and which interconnects all these systems. There is then selected the combination of sections LA1k, or LA2k and LR1k or LR2k which, by connection to the previously tested transmission channels, provides for a correct transmission of the informations.

At the end of these tests, a serial number is allocated to the tested interconnection system 1k, the selected inhibition signal EA1j or EA2j is memorized and then permanently applied to block the transmission through one of the sections LA1k or LA2k and also the position of the switch 3 corresponding to the selected inward line section LR1k or LR2k is memorized. By this way, the selected outward and inward transmission channels are well determined and subsequently ensure the conveyance of the digital words whereby the next interconnection system 1m can be tested, When all the interconnection systems have been successively tested, it is possible to sequentially proceed to the transfer of the seismic informations previously collected and recorded in the acquisition devices 12a . . . 12n.

The conveyance of the seismic informations collected and recorded in the acquisition device 12k associated to the interconnection system 1k is performed upon reception of an appropriate digital word consisting of a prefix, an order word indicating on the one hand that the operation to be performed is a transfer of recorded data and, on the other hand, that the transfer concerns said acquisition system 1k. The third cell is empty and forms a place for the informations to be transmitted. When the decoding member 11 identifies, when reading the second cell, that the operation to be performed concerns a transfer of data from the acquisition system 12k, it orders the triggering of the switch S0k on its input e02k (position 2) which authorizes the transfer of the recorded informations from the local acquisition device 12k to the encoder 13. It is to be observed that, in the device according to the invention, the acquisition of seismic data from each streamer element is performed in a synchronous manner by using the clock signal transmitted through the lines.

The transmission line selection assembly shown in FIG. 3 comprises a first assembly of circuits 20, adapted to generate the prefix and the eventual suffix of the transmitted digital words, a second assembly of circuits 21 adapted to generate the content of the second cell of each word, these two assemblies being respectively connected to two shift registers 22 and 23. The outputs of these two registers are respectively connected to two input terminals e301 and e302 of a four inputs switch S30, the two other inputs of which are respectively connected to the output of a shift register 25 and to the earth.

A memorizing member 24 where are recorded the test data forming the content of the third cell of each digital word of the test, is connected to the input of the shift register 25 and to the first input of a data comparator member 26 whose other input is connected to the central receiving and recording device 3. It receives therefrom data LT detected on one of the inward lines LR1 or LR2, and a control signal LV from a validation gate 27 whose input is connected to the output of the comparator member 26. The output of switch S30 is connected to the input of an encoding member 28(HDB3). The coded signals are directed through a two-way switch S10 towards the input of an amplifier-emitter 29 or to that of an amplifier-emitter 30. The outputs of these amplifiers are respectively connected to the transmission lines LA1a and LA2a. The switches S10 and S30 are actuated by a synchronization member 31 containing the main clock and which is controlled by signals EO and ED to form the digital words transmitted through the transmission lines LA1 and LA2.

The network recognition circuit 9, shown in FIG. 4, comprises a shift register 55 whose input is connected to the output of switch S4k (see FIG. 2). The inverted output of register 55 is connected to the input RAZ of a counter 32 whose output called "carry" output 32r is connected to the input RAZ of a bistable flip-flop 33. The output Q1 of the latter is connected to the control input of a validation gate 34 receiving on its other input the clock signal H reconstituted by the repeater-regenerators 4 and 5 (FIG. 2). The output of the gate 34 is connected to the control inputs of the shift register 55 and of the counter 32.

This recognition circuit is adapted to recognize digital words whose prefix comprises, for example, 16 identical pulses. When 16 consecutive pulses issued from the shift register are all at the logic level 1, the counter receives no pulse on its input RAZ and the clock continues to make the counter 32 progress until the latter generates on its "carry" output a pulse transmitted to the input RAZ of the bistable flip-flop 33, which has the effect of blocking the validation gate 34. The clock pulses H being no longer transmitted, the content of the second cell of the digital word remains in the shift register and is transmitted through connection 10 to the decoding member 11 (see FIG. 2). But, if the prefix of the digital word does not comprise 16 consecutive bits, as a result, for example, of a transmission error, no "carry", a pulse is emitted by counter 32 and the clock pulses, not interrupted by the validation gate 34, continue to shift the content of the shift register thereby preventing the memorization of the content of the second cell of the digital word.

The recognition circuit 9 is adapted to invalidate the digital words which are not preceded by a correct preamble, which, accordingly, are not taken into account.

Figure 5:
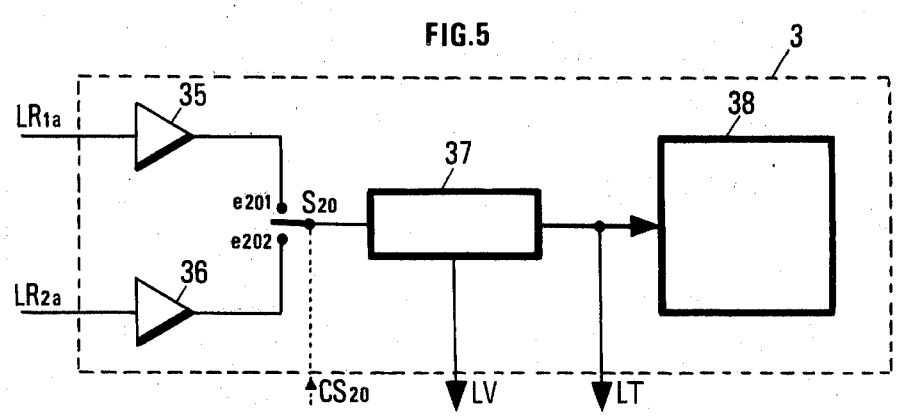
FIG. 5 diagrammatically shows the receiving and recording central device.

The central receiving and recording device 3 located on the ship comprises two repeaters-regenerators 35 and 36 (FIG. 5) adapted to amplify and/or reconstitute the digital words transmitted on the two inward lines LR1a and LR2a and whose outputs are connected to two inputs e201 and e202 of an electronic switch S20. The information transmitted through one of the lines LR1 and LR2 is decoded by a decoder HDB 3 included in an error detector 37 adapted to detect the errors in the network of the transmitted digital words, and also the optional errors appearing during the coding and/or the decoding of these words. The detector 37 produces the validation signal LV and the information LT which is transmitted to a recorder 38 when the received information concerns seismic data.

The control desk for manually proceeding to the successive operations of testing the different acquisition systems equipping the seismic streamer comprises (FIG. 6) a member 40 for the selection and display of the concerned interconnection system, a member 41 for the selection and display of the serial number (selection of the content of the second cell of the test words), two push members P1, P2 for respectively triggering the transmission of the serial number and of the test data, a switch C1 (44) for selecting the outward transmission line LA1 or LA2 to be tested, a switch C2 (45) adapted to select the inward transmission line LR1 or LR2 to be tested and a signal light L actuated by the output signal from gate 27 (FIG. 3) when the comparator member has detected a difference between transmitted and received test data, whereby the transmission error can be made visually apparent.

The combination member 19 comprises, for example, (FIG. 7), four bistable flip-flops 42, 43, 44 and 45, each provided with a first control input connected to a different output, respectively T1, T3, T4, T2 of a 3 bits/8 bits converter (46), the second control inputs of these flip-flops being respectively connected to the outputs of four gates 47, 48, 49 and 50. Each of these four gates 47, 48, 49 and 50 comprises a first input connected to a different output, respectively T3, T1, T2, T4 of the 3 bits/8 bits converter 46 and a second input connected to the output of the clock detection member 6 (see FIG. 2) generating a signal NH when no clock signal is detected on one of the two transmission lines LA1 or LA2.

The inputs of the 3 bits/8 bits converter 46 are connected to three outputs of the shift register 55 included in the recognition circuit 9 (see FIG. 4). The outputs respectively referred to as Q4 and Q5 of the flip-flops 44 and 45 generate signals SC1 and SC2 for controlling the amplifier-emitters EA1 and EA2 (see FIG. 2). The four signals respectively produced at the outputs Q2 and $\overline{Q2}$, and Q3 and $\overline{Q3}$ of the flip-flops 42 and 43 constitute the control signal SK of the electronic switch S3 (see FIG. 2) formed by the arrangement of four logic gates 51, 52, 53 and 54 (FIG. 7).

The inputs e31 and e32 of switch S3 are respectively connected to the inputs of two AND gates 51 and 52, respectively controlled by the signals generated at the outputs Q2 and Q3 of the two flip-flops 42 and 43. The input e33 is connected to one input of an AND gate 53 having three inputs, the two other inputs of which are respectively connected to terminals $\overline{Q2}$ and $\overline{Q3}$ of the two flip-flops 42 and 43. The outputs of AND gates 51, 52 and 53 are respectively connected to the three inputs of an OR gate 54 having three inputs. The signal delivered by said gate 54 is the output signal of switch S3.

The different operations for testing the state of the outwad LA1 and LA2 and inward LR1 and LR2 transmission lines may be performed with a variable periodicity depending both on the type of use and on the test means available. In the case where the seismic streamer is used substantially continuously to receive echoes of seismic shocks successively generated with a periodicity of a few seconds, the transmission lines cannot be tested by a human operator within so short a time. When it is nevertheless desired to proceed to test series between two consecutive seismic "shots", the synchronization member 31 is connected to a digital computer programmed according to the organigram shown on Tables I and II.

Figure 6:
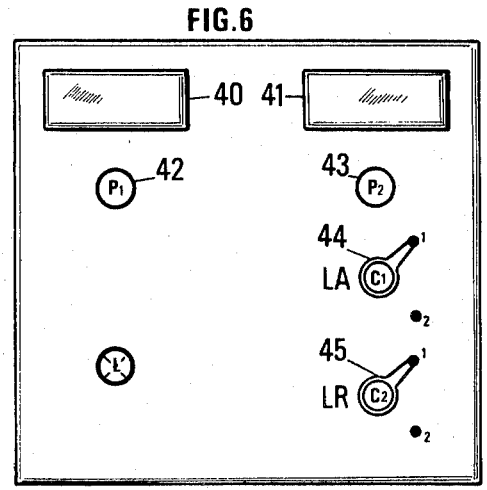
FIG. 6 diagrammatically shows a control desk for the assembly selecting the transmission lines, and FIG. 7 diagrammatically shows a signal combination member forming part of the means for detecting the received data.

When it is unnecessary to proceed to all the tests of the transmission lines with so high a frequency and that it is possible to wait for the occurrence of a sufficient interruption period in the transmission and reception process, the digital computer may be replaced by a human operator acting on a control desk shown in FIG. 6 and, sequentially operating accordiing to the test organigram defined in Table II. This may be the case in marine seismic prospecting when the ship reaches the end of the profile on survey and is manoeuvring for coming in line with another profile. Nevertheless, it is obviously preferable, as far as possible, to proceed systematically to all the tests before each new seismic "shot", by using a digital computer.

Irrespective of the performance of the tests operations by a computer or by a human operator, at the end of each test or test series, the location of the defective line sections is memorized and they are replaced as soon as the seismic streamer is raised up at the end of the exploration period.

The coding and decoding of the informations is performed in accordance with the code HDB 3, but it would not be out of the scope of the invention to make use of any other coding system such for example as code H B3 T or of appropriate coding and decoding integrated circuits. Similarly, it would not be out of the scope of the invention to replace the electronic switches by equivalent switching means.

TABLE I

TEST ORGANIGRAM
OF THE INTERCONNECTION SYSTEM 1a

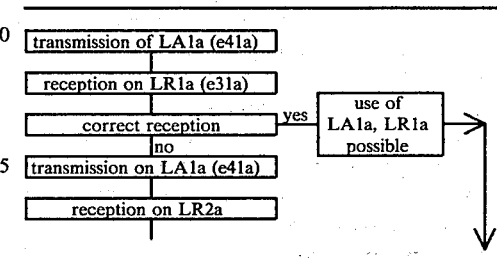

TABLE I-continued
TEST ORGANIGRAM OF THE INTERCONNECTION SYSTEM 1a
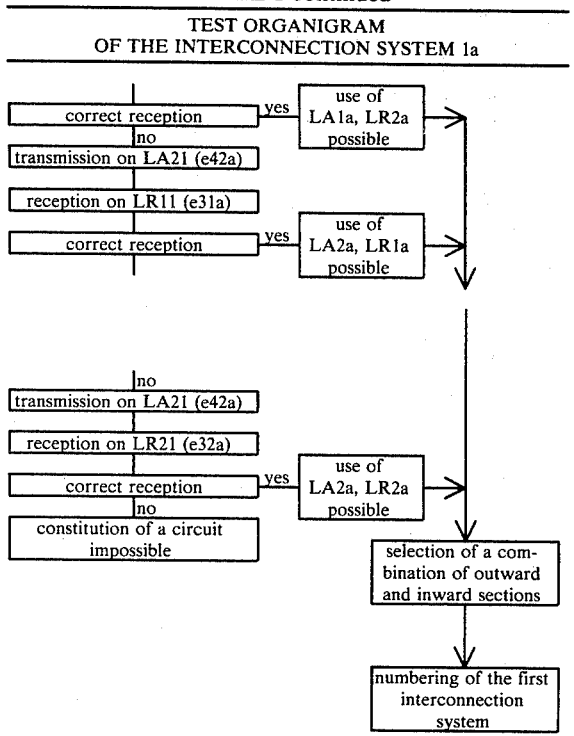
TABLE II
TEST ORGANIGRAM OF THE INTERCONNECTION SYSTEM 1k
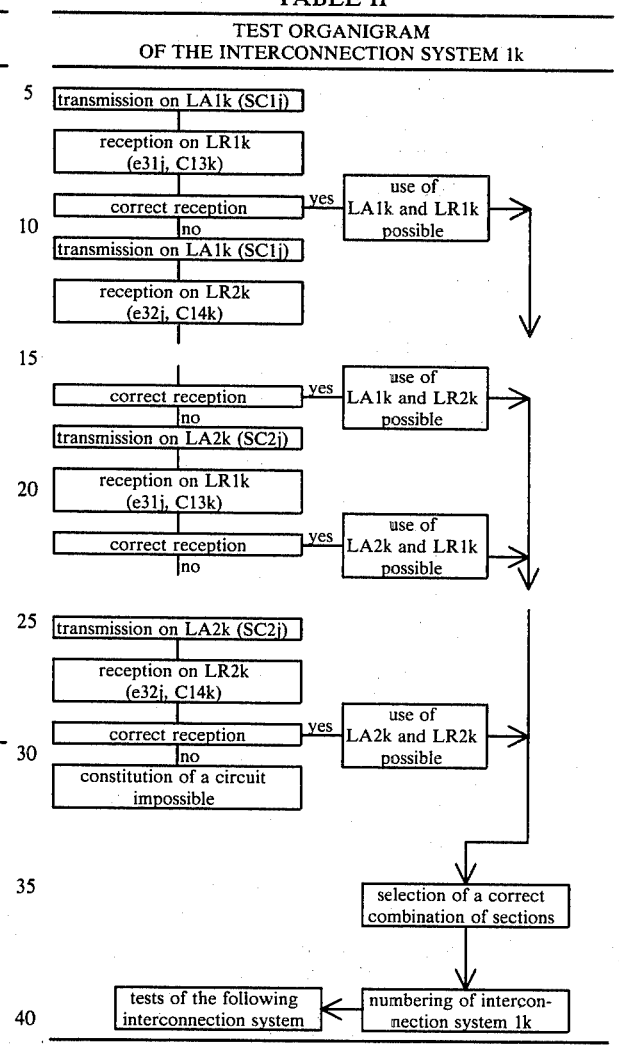
TABLE III
ORGANIGRAM FOR TESTS BY OPERATOR
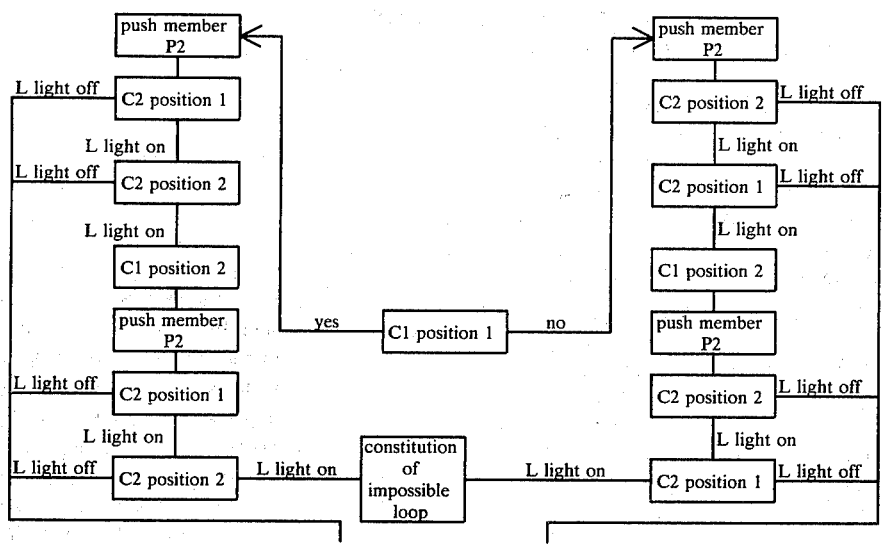

TABLE III-continued
ORGANIGRAM FOR TESTS BY OPERATOR

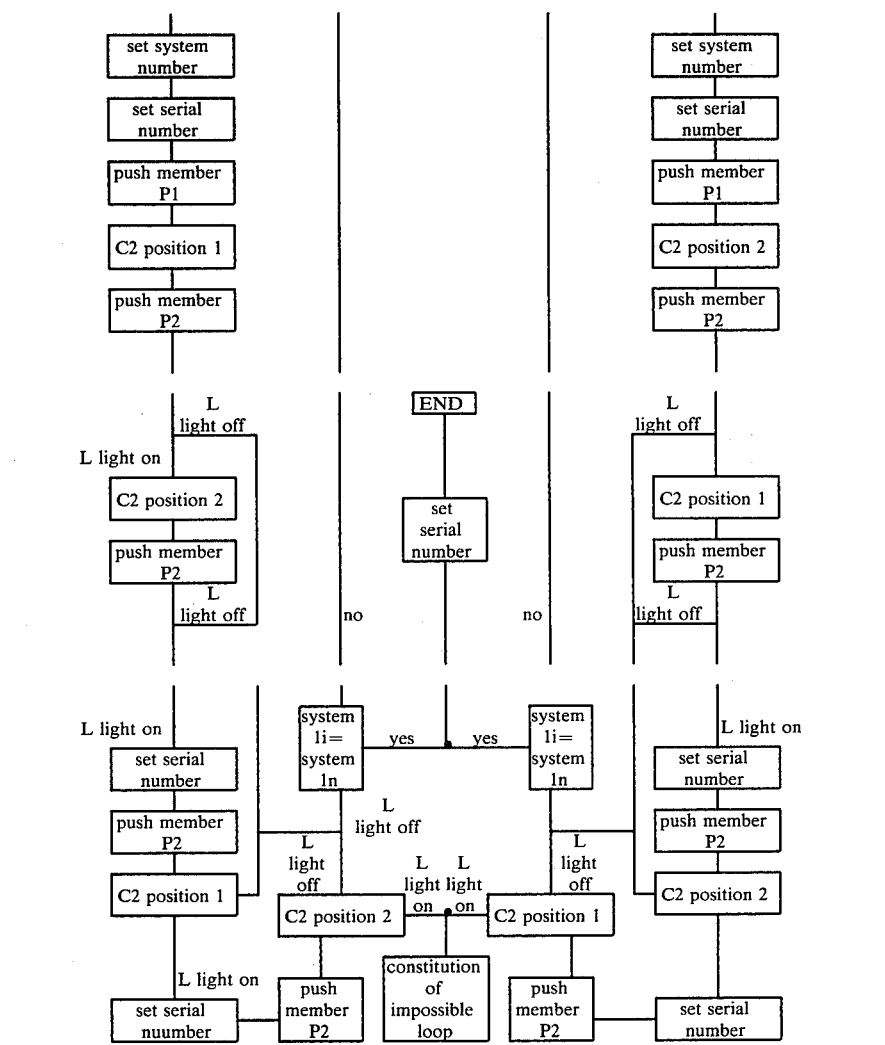

What is claimed is:

1. A device for transmitting information from a plurality of seismic acquisition devices to a central receiving and recording device (3), comprising: a plurality of interconnection systems respectively associated with the data acquisition devices, and said interconnection system being serially connected respectively to a transmission line selection assembly (2) through at least two separate outward transmission lines made up of a plurality of sections, and to the central receiving and recording device through at least two separate inward transmission lines made up of a plurality of sections; each interconnection system comprising means for detecting signals received on said outward transmission line sections reaching said interconnection system; switching means, controlled by said detecting means, for directing the received signals or signals emanating from a seismic data acquisition device associated therewith, onto one of said outward or inward line sections from said interconnection system, and said switching means comprising a first switch (S4) for selecting one of said outward transmission line sections reaching the interconnection system, a second switch (S0) for connecting the transmission line section selected by the first switch when the device is in operation, or for connecting the output of the associated acquisition device, to one of the sections of the outward transmission line from the interconnection system, or to an input (e33) of a third switch (S3) whose other inputs are connected to the sections of the inward transmission line reaching the interconnection system, and with said third switch being adapted for directing signals received on one of its inputs onto the sections of the inward transmission line running from the interconnection system; the line selection assembly being adapted for transmitting information or orders in the form of digital signals made up of bits series serially transmitted by a clock member and having a uniform structure or network made up of a first portion for validating the digital signals, a second portion employed for identifying the nature of the informations or orders transmitted in the digital signals as well as the interconnection system associated with said digital signals, and a third portion available for transferring data between the interconnection systems and the central receiving and recording device; and said detecting means, for detecting the signals received on the outward transmission line sections reaching each interconnection system, comprising means (4,5) for reconstituting a clock signal, capable of being employed as a time basis, from digital signals transmitted on the outward transmission lines, an element (6) for detecting the clock signals and a circuit for the network recognition (9) associated with a decoding member (11) for recognizing the nature of the information or orders included in the received digital signals.

2. A device according to claim 1, wherein the inward transmission line sections running to and from each interconnection system are connected thereto by means of amplification members (15, 16, 17, 18), the amplification members (17, 18) being connected to the inward transmission line running from the interconnection system and adapted for being blocked by control signals transmitted from the decoding member, and the outward transmission line sections running from each interconnection system being connected thereto through amplifiers (EA1, EA2) and adapted for being blocked by control signals transmitted from a combination member (19) connected to the network recognition circuit (9) and to the clock detection member (6), and said combination member being also adapted for generating signals for controlling the third switch (S3).

3. A transmission device according to claim 2, wherein the line selection assembly comprises first generating means (20, 23) for generating the first and second portions of the network of digital signals, second generating means (24, 25) for generating data relating to tests, switching means (S30) actuated by a synchronizing member (31) to constitute digital signals comprising the two first portions optionally followed with data relating to tests, and for directing these digital signals onto one of the outward transmission lines, and comparator means (26) for comparing the digital test signals transmitted on one of the outward transmission lines with the corresponding digital signals received at the receiving and recording central device, and adapted to detect the eventual identity between the transmitted test signals and the received test signals.

4. A device according to claim 3, wherein the central receiving and recording device (3) comprises a switch (S20) controlled by the synchronization member (31) for connecting one of the inward transmission lines to a recorder (38) and to comparator means (26).

5. A device according to claim 1, wherein the network recognition circuit (9) comprises a memorizing member (55) and logic members (32-34) adapted for controlling the memorization in said memorizing member of the second portion of the digital signals when the first portion thereof has a predetermined form.

6. A device according to claim 1, wherein the detection element (6) of clock signals is adapted for controlling the first and third switches (S4, S3), and the decoding member 11 is adapted for actuating the second switch (S0).

7. A device according to claim 3, wherein the synchronization member (31) is controlled by a control desk comprising control drives (42, 45) for selecting the interconnection systems and the transmission lines, and for controlling the transmission of digital signals corresponding to orders or data onto the transmission lines.

8. A device according to claim 3, wherein the synchronization member (31) is controlled by a digital computer provided with a test program.

9. A device according to claim 1 further comprising coding means (28) for coding digital signals transmitted on the transmission lines and decoding means (7, 8) for decoding the digital signals after their transmission.

10. In a device for sequentially transmitting seismic data from a plurality of seismic data acquisition devices to a central receiving and recording assembly comprising a plurality of interconnection systems respectively associated with the data acquisition device, at least two different inward transmission lines made up of a plurality of sections for serially connecting the interconnection system to the central receiving and recording assembly, and at least two different outward transmission lines made up of a plurality of sections serially connecting the interconnection systems for transmitting control signals to said interconnection systems, the improvement comprising a transmission line selection assembly comprising means for selecting from the outward and inward lines sections one outward line and one inward line providing for a good transmission of control signals to the different interconnection systems and from said interconnection systems to the central receiving and recording assembly, said selecting means comprising detecting means in each interconnection system for detecting the signals received on the outward transmission line sections reaching said interconnection system, and switching means, controlled by the detecting means, for directing the received signals onto one of the outward or inward line sections running from said interconnection system, the selection of a single inward line and a single outward line providing for the subsequent sequential transmission of seismic data from the different data acquisition devices to the central receiving and recording assembly upon reception by the interconnection systems of control signals from the transmission line selection assembly.

11. A transmission device according to claim 10, wherein the switching means comprises a first switch for selecting one of the outward transmission line sections reaching the interconnection system, a second switch for connecting the transmission line section selected by the first switch, or the output of the associated data acquisition device, to one of the sections of the outward transmission line running from the interconnection system or to an input of a third switch whose other input is connected to the sections of the inward transmission line reaching the interconnection system, the third switch being adapted for directing the signals received on one of its sections onto the sections of the inward transmission line running from the interconnection system.

12. A device according to claim 11, wherein the control signals are digital signals formed of bits series serially transmitted at a frequency determined by a clock member, and wherein the detecting means for detecting the signals received on the outward transmission line sections reaching each interconnection system comprises means for reconstituting a clock signal adapted for being employed as time basis, from digital signals transmitted on the outward transmission lines, and an element for detecting the clock signals and a circuit for the validation of the digital signals associated with a decoding member for recognizing the nature of orders included in the received digital signals.

13. A device according to claim 12, wherein the inward transmission line sections running to and from each interconnection system are connected thereto through amplification members, the amplification members connected to the inward transmission line running from the interconnection system being adapted for being blocked by control signals transmitted from the decoding member, and wherein the outward transmission line sections running from each interconnection system are connected thereto through amplifiers adapted for being blocked by control signals transmitted from a combination member connected to the validation circuit and to the clock detection element, and the combination member also adapted for generating signals for controlling the third switch.

14. A transmission device according to claim 13, wherein the line selection assembly comprises generating means for generating different parts of the digital signals, switching means actuated by a synchronizing member to constitute the digital signals by linking of the different parts of the signals and for directing these digital signals onto one of the outward transmission lines, and comparator means for comparing the digital test signals transmitted on one of the outward transmission lines with the corresponding digital signals received at the receiving and recording central device, and adapted for detecting the eventual identity between the transmitted test signals and the received test signals.

15. A device according to claim 14, wherein the central receiving and recording assembly comprises a switch controlled by the synchronizing member for connecting one of the inward transmission lines to a recorder and to the comparator means.

16. A device according to claim 12, wherein said validation circuit comprises a memorizing member and logic members adapted for controlling the memorization in said memorizing member of the second portion of the digital signals when the first portion thereof has a predetermined form.

17. A device according to claim 12, wherein the detection member of clock signals is adapted for controlling the first and third switches, and wherein the decoding member is adapted for actuating the second switch.

18. A device according to claim 14, wherein the synchronization member is controlled by a control desk comprising control device for selecting the interconnection systems and the transmission lines sections, and for controlling the transmission of digital signals corresponding to orders or information onto the transmission lines.

19. A device according to claim 14, wherein the synchronization member is controlled by a digital computer provided with a test program.

20. A device according to claim 10, further comprising coding means for coding digital signals transmitted on the transmission lines, and decoding means for decoding the digital signals after their transmission.

21. A method for transmitting information from plurality of seismic data acquisition devices to a central receiving and recording assembly comprising the steps of serially connecting the data acquisition devices through a plurality of interconnection systems associated respectively with the acquisition devices and at least two pairs of transmission lines, each consisting of a plurality of line sections, one pair of lines being inward lines connected to the central receiving and recording assembly, the other pair of lines being outward lines connected to an assembly for generating control signals, and for selecting, by testing operations on the two pairs of transmission lines performed before the transmission of the seismic data, of at least one transmission channel formed by the interconnection of line sections selected from those forming the inward and the outward line pairs, and adapted to ensure the accurate transmission of data between the control signal generating assembly and the central receiving and recording device through each one of the seismic data acquisition devices, said selecting operation comprising: connecting each interconnection system through at least one outward line section and at least one inward line section to at least one tested circuit, said circuit comprising outward and inward line sections connecting in series the preceding interconnections systems to said generating assembly and to said receiving and recording assembly, and then testing the newly arranged circuit.

* * * * *